Sept. 8, 1964
A. L. WASCHEVSKI
3,147,944
LICENSE PLATE HOLDER
Filed March 29, 1962
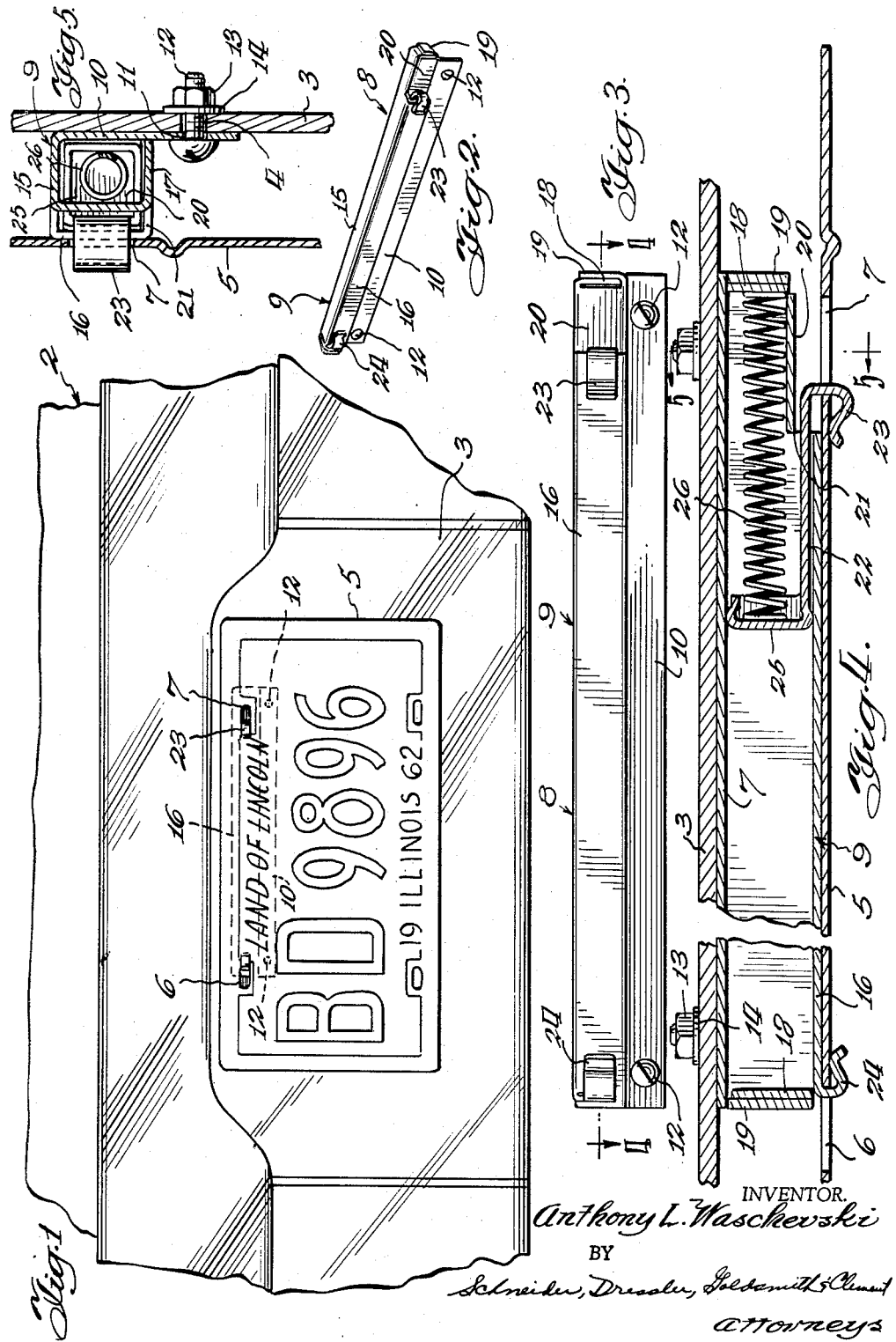
INVENTOR.
Anthony L. Waschevski
BY
Schneider, Dressler, Goldsmith & Clement
Attorneys

United States Patent Office 3,147,944
Patented Sept. 8, 1964

3,147,944
LICENSE PLATE HOLDER
Anthony L. Waschevski, 858 N. Paulina St., Chicago, Ill.
Filed Mar. 29, 1962, Ser. No. 183,548
1 Claim. (Cl. 248—28)

This invention relates to a license plate holder, with particular reference to means for facilitating the securement of a license plate to the support.

Although the support is intended primarily for use with automobile license plates, and will be specifically described in connection with such use, it will be understood that the invention is not limited to such use. The support may be used to support any substantially flat plate that can be engaged and held in place by a pair of clamps.

It is common practice to provide a portion of the rear end of an automobile with two laterally spaced apertures for reception of screws or bolts by means of which a license plate is secured in place. The screws or bolts usually become rusted after exposure to the weather and present a troublesome problem when it is necessary to replace an old license plate with a new one. Sometimes it is necessary to cut or saw the old screws or bolts in order to remove the old license plate.

In accordance with my invention, a support is permanently secured to the car, and the support is adapted to have a license plate detachably secured thereto by cooperation of a spring pressed clamp and a stationary clamp. The spring is preferably enclosed in a housing that protects it from the weather so that the movable clamp may be moved easily at any time to facilitate removal or attachment of a license plate at any time.

In the embodiment of the invention illustrated, the support comprises a sheet of metal bent along three parallel longitudinal lines to form a rectangular housing and a flange projecting beyond one of the walls. The flange is apertured and is permanently secured to some part of the automobile. One clamp is permanently secured to one end of the housing and is bent so that its free end extends toward the opposite end of the housing. The fixed clamp may be integral with the housing or may be secured to the housing in any suitable manner, such as, for example, by welding.

A second clamp, bent in the opposite direction, is movably mounted in the housing adjacent the opposite end of said housing and is urged toward the fixed clamp by a spring enclosed in the housing. The second, or movable clamp, may have one end extending into the housing to serve as a seat for one end of the spring. The ends of the metal sheet may be bent inwardly to form closed ends for the housing. The end of the housing closest to the movable clamp may form a seat for the other end of the spring. It is also possible to have one end of a spring secured to the movable clamp to pull it toward the fixed clamp. In such case the other end of the spring may be secured to the opposite end of the housing or to a pin intermediate the length of the housing. It may also be desirable to provide a guide for the spring, when the spring is arranged to exert a pulling force against the movable clamp, to insure straight line movement of the movable clamp.

License plates are provided with openings adjacent the top edge for attachment to an automobile in conventional manner. The license plate is manipulated manually until the movable clamp projects through one of said openings. The license plate is then used as a lever to push the movable clamp laterally against the action of the spring until the other opening in the license plate is in registration with the fixed lug. The license plate is then pressed against the housing so that the fixed clamp projects through the second opening in the license plate.

Release of the lateral pressure against the license plate allows the spring to move the license plate in the opposite direction and to move the movable clamp toward the fixed clamp. Suitable stop means is provided to limit movement of the movable clamp toward the fixed clamp. Each clamp engages an edge of the license plate defining the adjacent edge of the opening through which said clamp projects. In this position the license plate is securely held against accidental displacement, but may be easily removed, for replacement by a new license plate, by moving the license plate laterally until the portion of the fixed clamp that was previously in clamping engagement with an edge of the license plate contiguous to the adjacent opening is in registration with said adjacent opening. The license plate may then be lifted off the fixed clamp and then moved laterally in the opposite direction until the portion of the movable clamp that was previously in clamping engagement with an edge of the license plate contiguous to the other opening is in registration with its aperture. The license plate may then be lifted clear of the support.

Structure by means of which the above mentioned and other advantages of the invention may be attained is fully described in the following specification, taken in conjunction with the accompanying drawings showing a preferred illustrative embodiment of the invention, in which:

FIGURE 1 is a fragmentary rear elevational view of an automobile, showing a license tag held in place by a support embodying the present invention;

FIG. 2 is a perspective view of a support embodying the invention;

FIG. 3 is an enlarged front elevational view of the support shown in FIG. 2;

FIG. 4 is a longitudinal sectional view, taken along the line 4—4 of FIG. 3; and FIG. 5 is a cross sectional view, taken along the line 5—5 of FIG. 4.

In the drawings, an automobile 2 is provided with a flat surface 3 having a pair of laterally spaced apertures 4 for the reception of screws or bolts by means of which a license plate 5 may be secured to the automobile. The license plate is provided with a pair of laterally spaced openings 6 and 7 adjacent its upper edge to facilitate securement of the license plate to an automobile. A support 8 comprising a housing 9 and a flange 10 is secured to the automobile. Flange 10 is provided with two apertures 11 spaced to register with apertures 4, and the support is firmly secured to the automobile by screws or bolts 12. As shown in FIG. 5, each screw or bolt is held in place by a nut 13 tightened against a washer 14.

Housing 9 is integral with flange 10 and is formed by bending a metal sheet about three parallel lines to form a top wall 15, a front wall 16, and a bottom wall 17. A portion of flange 10 serves as a back for the housing. The ends of the housing may be closed by bending in flaps from the ends of any of the walls of the housing. As shown in the drawings, the end closure is formed by bending in flaps 18 and 19 from the top and bottom walls 15 and 16, respectively. A portion of front wall 16 adjacent one end of the housing is offset, as indicated at 20, to form a gap 21 through which one portion 22 of a movable clamp 23 is permitted to move. The end of clamp 23 is bent toward a fixed clamp 24 bent in the opposite direction from the opposite end of front wall 16. Clamp 23 is adapted to project through opening 7 and to engage one edge of the license plate defining a portion of the circumference of the opening 7 that is closest to opening 6. Clamp 24 is adapted to project through opening 6 and to engage one edge of the license plate defining portion of the circumference of opening 6 closest to opening 7. Clamp 24 is shown as being integral with wall 16, but it will be understood that it may be formed as a separate member and rigidly secured to housing 9 in any suitable manner, such as for example, by welding.

As shown best in FIG. 4, portion 22 of clamp 23 is bent to form a cup shaped seat 25 in which one end of a spring 26 is seated. The other end of spring 26 bears against the end closure formed by flaps 18 and 19 closest to clamp 23. Spring 26 exerts a constant force against seat 25 urging clamp 23 toward the fixed clamp. Although the movable clamp is shown on the right, as viewed in FIG. 4, it will be understood that the movable clamp may be adjacent either end of the housing. The action of spring 26 is the same whether it presses against seat 25, as shown in the drawings, or pulls clamp 23 in the same direction. The pulling action may be obtained by securing one end of the spring to the arm 22 and the other end to any suitable portion of housing 9.

The method of attaching the license plate to the support 8 is very simple. The license plate is manipulated manually until movable clamp 23 extends through aperture 7. The license plate 5 is then moved relative to clamp 24 and moves clamp 23 against the action of spring 26. This movement of the license plate relative to clamp 24 brings opening 6 into registration with clamp 24. The license plate is then pressed against wall 16 so that clamp 24 projects through opening 6. Release of the pressure forcing lateral movement of the license plate against the action of spring 26 causes the spring to move clamp 23 toward clamp 24. Clamp 23 also moves the license plate with it until further movement of the license plate is stopped by engagement of one edge of the license plate contiguous to opening 6 against the inner surface of clamp 24. At the same time, the inner surface of clamp 23 engages a portion of the edge of license plate 5 contiguous to opening 7. The portions of the edge of plate 5 contiguous to openings 6 and 7 engaged by clamps 24 and 23, respectively, are closer to each other than any other portions of said edges, and the license plate is firmly held in place against the support 8.

However, when the license plate is to be removed, it is simply pushed to one side against the action of spring 26 until the opening 6 is in registration with the portion of clamp 24 previously engaged with the edge of plate 5 contiguous to opening 6. The license plate is then pulled outwardly to remove the portion previously engaged by clamp 24. The license plate is then moved in the opposite direction until aperture 7 is in registration with the portion of clamp 23 previously engaged with the edge of plate 5 contiguous to opening 7. The license plate is then pulled outwardly to disengage it from clamp 23.

Although I have described a preferred embodiment of the invention in considerable detail, it will be understood that the description thereof is intended to be illustrative, rather than restrictive, as many details of construction may be modified or changed without departing from the spirit or scope of my invention. Accordingly, I do not desire to be restricted to the exact structure disclosed.

I claim:

A support for a license plate having a pair of spaced openings, said support comprising a housing having an offset in one wall thereof, said offset having a slot therein, a spring enclosed in said housing, a clamp engageable with the edge of said plate contiguous to one of said openings, said clamp having an intermediate portion extending through said slot and having one end within said housing, said spring having one end bearing against one end of said housing and its other end bearing against said end of the clamp, and a second clamp fixed relative to said housing, said first clamp being movable with said plate against the action of said spring to move said other opening into registration with said second clamp, said spring being operable to move said first clamp toward said second clamp to cause each of said clamps to engage an edge of said plate contiguous to one of said openings to thereby retain said plate flush against one surface of said support and against accidental displacement relative to said support.

References Cited in the file of this patent

UNITED STATES PATENTS

| | | |
|---|---|---|
| 1,384,229 | Bolich | July 12, 1921 |
| 1,913,082 | Keagle | June 6, 1933 |